United States Patent [19]

Ayers

[11] Patent Number: 4,963,215
[45] Date of Patent: Oct. 16, 1990

[54] METHOD FOR DEBULKING PRECURED THERMOPLASTIC COMPOSITE LAMINAE

[75] Inventor: Donald J. Ayers, Snohomish, Wash.

[73] Assignee: The Boeing Company, Seattle, Wash.

[21] Appl. No.: 368,165

[22] Filed: Jun. 14, 1989

Related U.S. Application Data

[63] Continuation of Ser. No. 129,047, Dec. 7, 1987, abandoned.

[51] Int. Cl.$^5$ .............................................. B32B 31/00
[52] U.S. Cl. ...................................... 156/286; 156/287; 156/307.3; 156/308.2
[58] Field of Search ............... 156/87, 285–287, 156/307.7, 307.3, 308.2, 312

[56] References Cited

U.S. PATENT DOCUMENTS

| | | | |
|---|---|---|---|
| 2,923,978 | 2/1960 | Corzine | 264/571 |
| 2,978,806 | 4/1961 | Herbert | 156/286 |
| 3,666,600 | 3/1969 | Yoshino | 156/382 |
| 3,971,669 | 7/1976 | Wrzesien | 428/367 |
| 4,062,917 | 12/1977 | Hill et al. | 264/102 |
| 4,174,241 | 11/1979 | Rockar et al. | 156/102 |
| 4,216,047 | 8/1980 | Hilliard et al. | 156/285 |
| 4,311,661 | 1/1982 | Palmer | 264/510 |
| 4,357,193 | 11/1982 | McGann et al. | 156/286 |
| 4,410,385 | 10/1983 | Murphy | 156/181 |
| 4,475,976 | 10/1984 | Mittelstadt et al. | 156/286 |
| 4,562,033 | 12/1985 | Johnson et al. | 264/510 |
| 4,563,232 | 1/1986 | Peake | 156/182 |
| 4,576,857 | 3/1986 | Gannett | 428/272 |
| 4,622,091 | 11/1986 | Letterman | 156/286 |
| 4,664,737 | 5/1987 | Schlosstein | 156/285 |

FOREIGN PATENT DOCUMENTS 158343  10/1985  European Pat. Off.
2343453  7/1975  Fed. Rep. of Germany.

Primary Examiner—George F. Lesmes
Assistant Examiner—J. Davis
Attorney, Agent, or Firm—Seed and Berry

[57] ABSTRACT

A method for forming a thermoplastic laminate having a desired laminate thickness is disclosed. Layers of composite material using precured or partially precured thermoplastic resin laminate layers are layed-up on a forming tool. A relatively constant, uniform pressure is applied to the layers to produce a preconsolidated laminate having a thickness approximately equal to the ultimate desired laminate thickness. The laminate layers are free to slide relative to one another during debulking because they are either cured or partially cured. Thus, wrinkles are avoided. The debulked laminae are then consolidated in a conventional autoclave under elevated temperature and pressure.

5 Claims, 2 Drawing Sheets

METHOD FOR DEBULKING PRECURED THERMOPLASTIC COMPOSITE LAMINAE

STATEMENT OF GOVERNMENT INTEREST

The U.S. government has certain rights in this invention.

RELATED APPLICATIONS

This application is a continuation of co-pending U.S. Ser. No. 97.129,047 filed Dec. 7, 1987 and now abandoned.

TECHNICAL FIELD

The invention relates to methods and apparatus for forming composite laminates from layers of composite material. More specifically, the invention relates to methods for forming thermoplastic composite laminates.

BACKGROUND ART

Composite materials are increasingly used in modern aircraft to inc-ease the strength to weight ratio, load capacity and performance characteristics thereof. In some modern aircraft, composite materials such as graphite fiber/epoxy resin composites have replaced metal components as structural elements of the aircraft. As composite materials have replaced metal materials, new fabrication techniques for making composite material structures have been developed.

There are two generic classes of plastic resins which are used in combination with reinforcing fibers of the composite material. One class of plastic resins is known as thermosetting resins, the other class is known as thermoplastic resins. Thermoplastic resin/fiber reinforced composite materials are characterized in that the resins are reformable under heat after the resins have been cured. Composites made from thermosetting resins and reinforcing fibers cannot be reformed once they have been cured. There are also differences in the manner of handling and forming laminates from these different classes of materials.

Thermosetting techniques are most familiar to the general public and are often employed in the construction of fiberglass boats. Composites which use a thermosetting resin are typically supplied on large rolls in the form of tape. The uncurved resin is tacky at room temperature. Therefore, the tape is supplied with a backing which permits the material to be coiled on a roll. This tackiness or "drape" of the thermosetting composite materials is advantageous in many applications. For example, thermosetting composite materials can be placed upside down in a mold and will remain in place.

Thermosetting materials are typically cured in an autoclave under elevated temperatures and pressures. In a conventional autoclave technique, layers of thermosetting resin, pre-impregnated, fibrous material, are layed-up on or around a forming tool. Air pockets can be squeegeed or rolled out of the laminate layers as the layers are applied. Air does not reenter the laminate between the layers because the layers are sticky. After the uncured laminate has been layed-up, breather layers are positioned around and above the laminate. A microporous film, commonly referred to as a vacuum bag, is then positioned over the uncured laminate, breather layers and is sealed to the forming tool. The vacuum bag is evacuated and the entire assembly is cured at elevated temperatures and pressures in an autoclave.

The use of thermosetting resins is particularly well adapted to the autoclave processing technique because the uncured laminate is substantially void free and has approximately the same thickness as the resulting cured laminate. This process is also applicable to very large parts as relatively large autoclaves are presently available.

In contrast to the above, composite materials made with thermoplastic resins are somewhat difficult to handle. The thermoplastic resins are at least partially cured when supplied in the rolled form. The laminate are not tacky at room temperature as are laminate made with thermosetting resins. The laminae tend to slide relative to one another when positioned in a laminate stack. Therefore, air pockets can not be squeegeed or rolled out of the laminate layers as the layers are applied. Furthermore, the layers often retain a slight curvature from the roll and tend to stack up in a bulky stack with many air gaps. For example, in a 24-ply laminate of thermoplastic resin pre-impregnated composite material, the unconsolidated laminate will have a thickness of approximately four inches. The ultimate, desired thickness for the consolidated thermoplastic laminate is only approximately 0.12 inch. The conventional autoclave method described above does not satisfactorily debulk the laminate stack.

Thermoplastic laminates are typically formed by the press-work method because of the above described limitations of the conventional autoclave technique. The press-work method involves the use of a two part mold which, when assembled, forms a void having the ultimate, desired shape of the composite part. Layers of composite material are placed in the mold. The mold halves are then forced together and heated to a high temperature to compress and consolidate the layers. This method has proven satisfactory for producing small parts in high volume. However, economic disadvantages are associated with the press-work method, if relatively few parts are made, or if the parts are extremely large requiring very large molds and presses.

As stated above, composite materials have replaced metal, even in structural applications for aircraft, such as frame members and stringers. Stringers may be in the form of I-beams or T-beams of up to 40 feet long or longer. A great advantage can be obtained if thermoplastic materials are used for construction of these beams because the thermoplastic structural element can be reformed by local application of heat to correct manufacturing errors or deviations in manufacturing tolerances.

Thus, a need exists for a method for preparing large, composite structures from thermoplastic materials which does not require the use of expensive molds or large presses.

DISCLOSURE OF THE INVENTION

It is an object of the present invention to provide a method for forming large, composite structures made from thermoplastic laminates.

It is another object of the present invention to consolidate composite structures made from thermoplastic laminates in an autoclave.

It is yet another object of the present invention to achieve the above two objects while preventing voids or wrinkles from occurring in the thermoplastic composite structure.

The invention achieves these objects, and other objects and advantages which will become apparent from the description which follows, by positioning a plurality of non-tacky, at least partially precured thermoplastic composite layers, one on top of the other, on a forming tool to form a bulky laminate stack. The stack has a height which is substantially greater than the ultimate desired laminate thickness. A vacuum bag is then positioned over the bulky laminae and the forming tool. Sufficient pressure is applied to the vacuum bag to debulk the laminae to approximately the desired laminate thickness. The vacuum bag is then tensioned to eliminate wrinkles and sealed to the forming tool. Wrinkles between the laminate layers are avoided because the layers are not tacky and are free to slide locally with respect to one another.

In the preferred embodiment, the forming tool, debulked laminate stack and vacuum bag are processed in an autoclave at an elevated temperature and pressure to consolidate the debulked laminate stack.

BEST MODE FOR CARRYING OUT THE INVENTION

Figure 1:
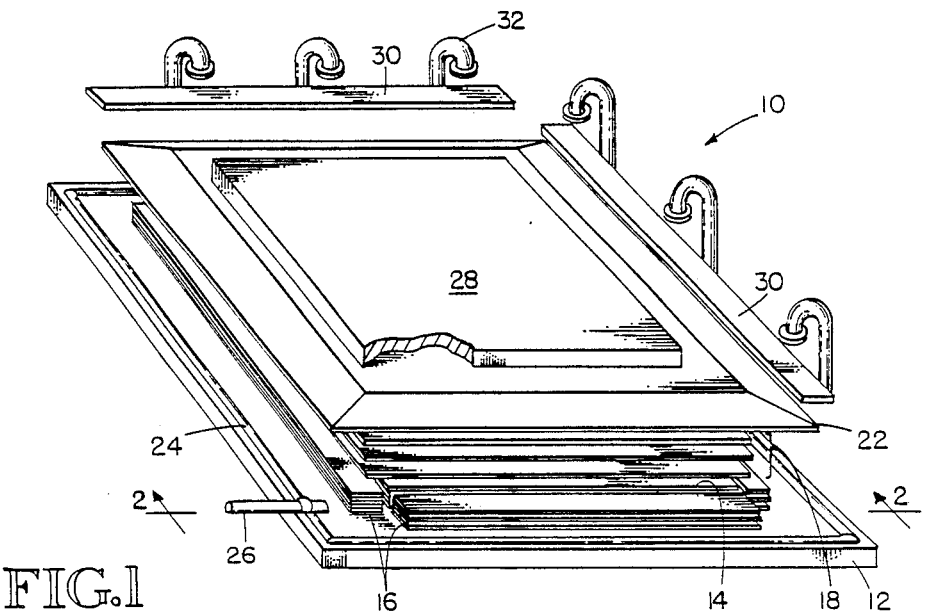
FIG. 1 is an isometric, exploded view of an apparatus for laying-up thermoplastic resin composite materials on a forming tool.

An autoclave assembly, for use with the method of the present invention, is generally indicated at reference numeral 10 in FIG. 1. The assembly 10 includes a flat forming tool 12 which is constructed of a metal capable of withstanding temperatures in excess of 700° F. without significant loss of stiffness. The forming tool provides a working surface for producing a desired laminate having a sheet-like appearance. FIGS. 1-5 illustrate a method for producing a twenty-four layer laminate of graphite reinforcing fibers and a thermoplastic polyether-ether ketone resin. The method of the present invention permits thermoplastic composite materials to be processed in an autoclave. After consolidation in an autoclave, the laminate will have a thickness of approximately 0.12 inch. The size of thermoplastic sheets produced by this method is only limited by the size of available autoclaves.

In a first step, layers 14 of graphite fiber/thermoplastic resin material are stacked one on top of the other on the forming tool 12. Peripheral layers of breather material 16, having a thickness approximately equal to the desired thickness of the consolidated laminate, are positioned around the periphery of the layers 14. Layers of dry, fiberglass fabric 18 are positioned on top of the thermoplastic layers 14. The peripheral breather materials 16 and fiberglass fabric 18 are conventionally used in autoclave procedures. In conformance with conventional autoclave techniques, a thin film 22 of high temperature material is placed over the peripheral breather material 16, dry fiberglass fabric 18, to be sealed to the forming tool 12 by a peripheral seal 24. A vacuum tube 26 permits air to be evacuated from beneath the thin film 22. Film 22 is commonly referred to in the industry as a vacuum bag, although the film in and of itself does not enclose a volume.

Figure 2:
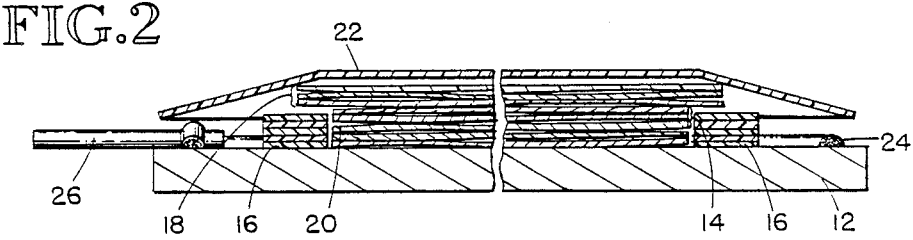
FIG. 2 is a cross-sectional view illustrating a first step of the inventive method.

The twenty-four layers of thermoplastic material 14 will have an unconsolidated thickness of approximately four inches. Only five layers have been shown for purposes of illustration in the figures. As shown in FIG. 2, voids and air gaps 20 exist between the layers 14. Processing of the layers using conventional autoclave techniques would not successfully compress the unconsolidated layers and will result in a laminate having an unacceptably large number of voids. Furthermore, the laminate would not be consolidated to the ultimate desired thickness of 0.12 inch.

In the inventive method shown in the figures, it is important that cured, or partially cured thermoplastic material 14 is used. That is, the layers must not be sticky or tacky and must be free to slide relative to one another when assembled as shown in FIG. 2. The relative slideability of the layers prevents the formation of wrinkles in the layers during a debulking step which is described below.

In contrast to conventional thermosetting autoclave techniques, a flat weight 28 (FIG. 3), manufactured from a suitable high temperature material, is positioned on top of the thin film 22 to debulk the layers 14. The weight has substantially uniform density and applies a pressure of approximately 10 to 15 pounds per square inch (gage) to the layers. It has been found that this pressure is sufficient to debulk the layers approximately to the ultimate desired laminate thickness of 0.12 inch. During debulking, the laminate layers are free to slide with respect to one another, thus, wrinkles are avoided. Other techniques for debulking the layers, such as spot welding layers of the material to one another prior to evacuating the assembly, prevent the layers from sliding with respect to one another and result in laminates with voids and/or wrinkles.

Figure 3:
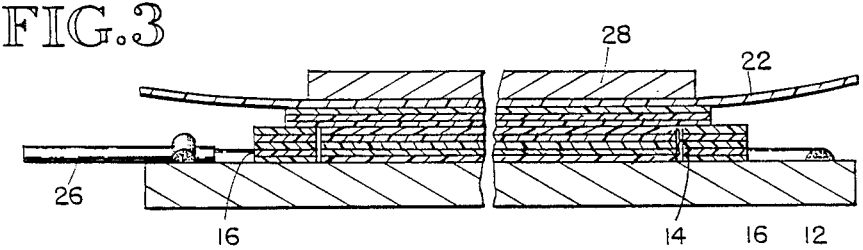
FIG. 3 is a cross-sectional view illustrating a second step of the inventive method.

In a subsequent step shown in FIG. 3, the thin film 22 is tensioned to remove any wrinkles therefrom.

Figure 4:
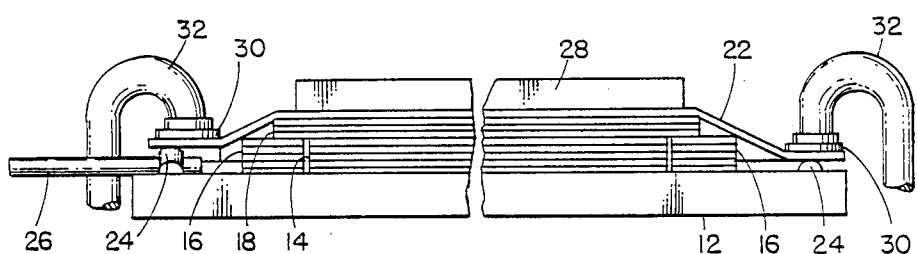
FIG. 4 is a cross-sectional view illustrating a third step of the inventive method.

As shown in FIG. 4, edges of the thin film 22 are then sealed to the forming tool by peripheral plates 30 and C-clamps 32. The seal material 24 is conventional. The assembly is then evacuated through vacuum tube 26 and processed in a conventional autoclave.

Figure 5:
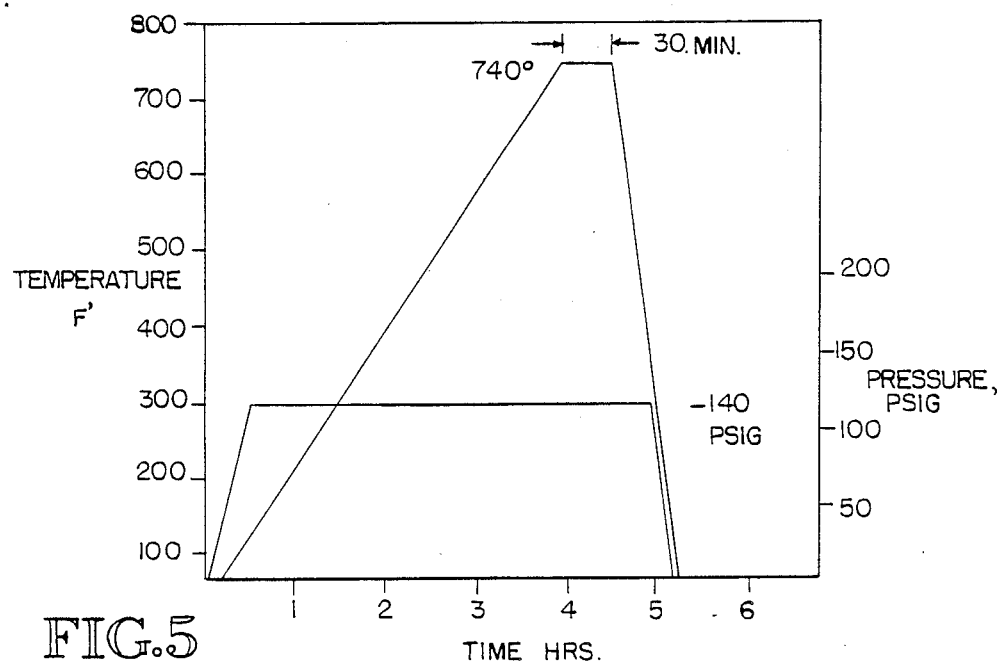
FIG. 5 graphically illustrates processing of the assembly shown in FIG. 4 according to an elevated temperature and pressure schedule.

As shown in FIG. 5, the assembly is relatively slowly heated to a temperature of approximately 740° F. During this period, autoclave pressure is steadily increased to approximately 140 psig. The autoclave is maintained at a temperature of approximately 740° F. for 30 minutes. The autoclave and assembly are then allowed to cool as rapidly as is practicable.

Figure 6:
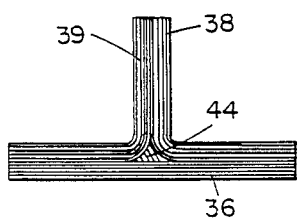
FIG. 6 is a cross-sectional view illustrating one application of the method of the present invention.

The resulting laminate has a thickness of approximately 0.12 inch and is substantially void-free. The laminate can be reformed by localized heating to a variety of different shapes. For example, in FIG. 6, a T-beam is shown having a lower flange 36 connected to first and second L-beams 38, 39. A radius filler 44 is used to prevent the formation of a void at the junction of these three pieces. The L-beams are formed by reforming a sheet similar to lower flange 36 about a forming tool. By merely heating the forming tool and applying pressure to the sheet, the L-shape is obtained. The radius filler 44 is then positioned on top of the lower flange 36, and the L-beams are positioned as shown.

The entire structure is then heated to approximately 740° F. to consolidate the beam.

As will be apparent to those of ordinary skill in the art, very large sheets of thermoplastic material can be made by this process. Large presses and molds are not required as in the press-work method. Variations and other embodiments of the inventive method are also contemplated. Therefore, the invention is not to be limited by the above description but is to be determined in scope by the claims which follow.

I claim:

1. A method for forming a thermoplastic laminate having a desired laminate thickness, from a plurality of layers of at least partially precured thermoplastic composite material, comprising the steps of:
   positioning a plurality of non-tacky, partially precured thermoplastic composite layers one on top of another on a forming tool to form a bulky laminate stack having a height substantially greater than the desired laminate thickness;
   positioning a vacuum bag over the laminate stack and forming tool;
   applying pressure to the vacuum bag only after the laminate stack is assembled to debulk the laminate stack to approximately the desired laminate thickness wherein during the pressure applying step a substantially continuous pressure of approximately 10 to 15 psig. is applied and maintained;
   tensioning the vacuum bag to eliminate wrinkles and maintaining said pressure during tensioning and
   sealing the vacuum bag to the forming tool and maintaining said pressure during sealing.

2. The method of claim 1 wherein the pressure is applied by positioning a weight having a substantially uniform density and a substantially planar bottom surface on the vacuum bag.

3. The method of claim 1 including the steps of:
   evacuating the vacuum bag; and
   processing the forming tool, debulked laminate stack and vacuum bag in an autoclave at an elevated temperature and pressure to consolidate the debulked laminate stack while during said processing the pressure is maintained.

4. The method of claim 3 wherein the pressure is applied by positioning a weight having a substantially uniform density and a substantially planar bottom surface on the vacuum bag.

5. A method for forming a thermoplastic laminate having a desired laminate thickness, from a plurality of layers of precured thermoplastic composite material, comprising the steps of:
   positioning a plurality of non-tacky, precured thermoplastic composite layers one on top of another on a forming tool to form a bulky laminate stack having a height substantially greater than the desired laminate thickness;
   positioning a vacuum bag over the laminate stack and forming tool;
   positioning a weight having as substantially uniform density and a substantially planar bottom surface on the vacuum bag to apply a substantially uniform, continuous pressure of approximately 10 and 15 psig. thereto only after the laminate stack is assembled;
   tensioning the vacuum bag with the weight remaining thereon;
   sealing the vacuum bag to the forming tool with the weight remaining on the vacuum bag;
   evacuating the bag with the weight remaining thereon; and
   processing the forming tool, debulked laminate stack, weight and vacuum bag in an autoclave at an elevated temperature and pressure to consolidate the debulked laminate stack.

* * * * *